(12) United States Patent
Yang et al.

(10) Patent No.: US 10,642,443 B2
(45) Date of Patent: May 5, 2020

(54) DISPLAY DEVICE

(71) Applicant: Shanghai Tianma Micro-Electronics Co., Ltd., Shanghai (CN)

(72) Inventors: Fan Yang, Shanghai (CN); Lei Niu, Shanghai (CN); Jun Ma, Xiamen (CN); Jialing Li, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 143 days.

(21) Appl. No.: 15/870,481

(22) Filed: Jan. 12, 2018

(65) Prior Publication Data

US 2018/0136817 A1 May 17, 2018

(30) Foreign Application Priority Data

Oct. 27, 2017 (CN) .......................... 2017 1 1026293

(51) Int. Cl.
*G06F 3/042* (2006.01)
*G06F 3/0481* (2013.01)
*G02B 5/30* (2006.01)
*G06F 3/041* (2006.01)
*G02F 1/13363* (2006.01)
(Continued)

(52) U.S. Cl.
CPC ....... *G06F 3/04815* (2013.01); *G02B 5/1861* (2013.01); *G02B 5/3058* (2013.01); *G02B 30/00* (2020.01); *G02B 30/27* (2020.01); *G02F 1/13363* (2013.01); *G02F 1/133504* (2013.01); *G02F 1/133528* (2013.01);
(Continued)

(58) Field of Classification Search
CPC ........... G02F 1/133504; G02F 1/13363; G02F 1/133528; G02F 2201/305; G06F 3/04815; G06F 3/041; G06F 3/0354; G06F 3/0362; G02B 5/3058; G02B 27/2214

See application file for complete search history.

(56) References Cited

U.S. PATENT DOCUMENTS 10,197,828 B2 * 2/2019 Wu ........................ G02F 1/1323
2008/0297696 A1 * 12/2008 Banerjee .............. G02B 5/3058
349/65

(Continued)

FOREIGN PATENT DOCUMENTS

CN 104335100 A 2/2015
CN 106324847 A 1/2017

*Primary Examiner* — Christopher E Leiby
(74) *Attorney, Agent, or Firm* — Anova Law Group PLLC

(57) ABSTRACT

A display panel is provided. The display panel comprises a display panel; and a light modulation substrate disposed opposite to the display panel. The light modulation substrate includes a base layer and a transparent dielectric layer covering the base layer. The base layer has a first surface facing the display panel and an opposing second surface, and the transparent dielectric layer is disposed on the first surface of the base layer. A plurality of reflective gratings are disposed on the base layer. The transparent dielectric layer has a first surface facing the base layer and an opposing second surface, and the second surface of the transparent dielectric layer is a transparent dielectric layer surface. The transparent dielectric layer has a refractive index of n, and n>1. Outgoing light of the display device converges to a plurality of light-emitting points outside the display device.

17 Claims, 12 Drawing Sheets

(51) Int. Cl.
    *G06F 3/0354*     (2013.01)
    *G06F 3/0362*     (2013.01)
    *G02F 1/1335*     (2006.01)
    *G02B 5/18*     (2006.01)
    *G02B 30/00*     (2020.01)
    *G02B 30/27*     (2020.01)

(52) U.S. Cl.
    CPC .......... *G06F 3/0354* (2013.01); *G06F 3/0362* (2013.01); *G06F 3/041* (2013.01); *G02F 2201/305* (2013.01)

(56) References Cited

U.S. PATENT DOCUMENTS

| | | | |
|---|---|---|---|
| 2010/0026930 A1* | 2/2010 | Jepsen | G02B 5/18 349/62 |
| 2011/0170184 A1* | 7/2011 | Wolk | G02B 27/2214 359/463 |
| 2013/0003176 A1* | 1/2013 | Yang | G02B 27/2214 359/463 |
| 2015/0226897 A1* | 8/2015 | Kim | G02B 5/3058 359/485.05 |
| 2018/0096187 A1* | 4/2018 | Kwon | G06F 1/1613 |
| 2018/0217473 A1* | 8/2018 | Frank | G02F 1/335 |
| 2019/0033656 A1* | 1/2019 | Tan | G02F 1/29 |
| 2019/0121171 A1* | 4/2019 | Tan | G02F 1/137 |

\* cited by examiner

DISPLAY DEVICE

CROSS-REFERENCES TO RELATED APPLICATIONS

This application claims the priority of Chinese Patent Application No. 201711026293.0, filed on Oct. 27, 2017, the entire contents of which are incorporated herein by reference.

FIELD OF THE DISCLOSURE

The present disclosure generally relates to the display technology and, more particularly, relates to a display device.

BACKGROUND

With the development of display technology, three-dimensional (3D) display technology has become one of the most focused research and development directions of display technology. In 3D display devices, the light propagation direction is highly desired to be precisely controlled.

In an existing 3D display device, a transmissive grating is often adopted to modulate the direction of incident light. By adjusting the period of the transmissive grating, the wavelength of the coherent light source, the incident direction of the coherent light source and other parameters, the propagating direction of the outgoing light can be modulated.

However, the existing 3D display device has a substantially small viewing angle ~90° and, meanwhile, the transmissive grating is often etched on a transparent high refractive index substrate, such as a glass substrate, which limits the processing technology and material selection The disclosed display device is directed to solve one or more problems set forth above and other problems.

BRIEF SUMMARY OF THE DISCLOSURE

One aspect of the present disclosure provides a display device. The display device comprises a display panel; and a light modulation substrate disposed opposite to the display panel. The light modulation substrate includes a base layer and a transparent dielectric layer covering the base layer. The base layer has a first surface facing the display panel and an opposing second surface, and the transparent dielectric layer is disposed on the first surface of the base layer. A plurality of reflective gratings are disposed on the base layer. The transparent dielectric layer has a first surface facing the base layer and an opposing second surface, and the second surface of the transparent dielectric layer is a transparent dielectric layer surface. The transparent dielectric layer has a refractive index of n, and n>1. Outgoing light of the display device converges to a plurality of light-emitting points outside the display device.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
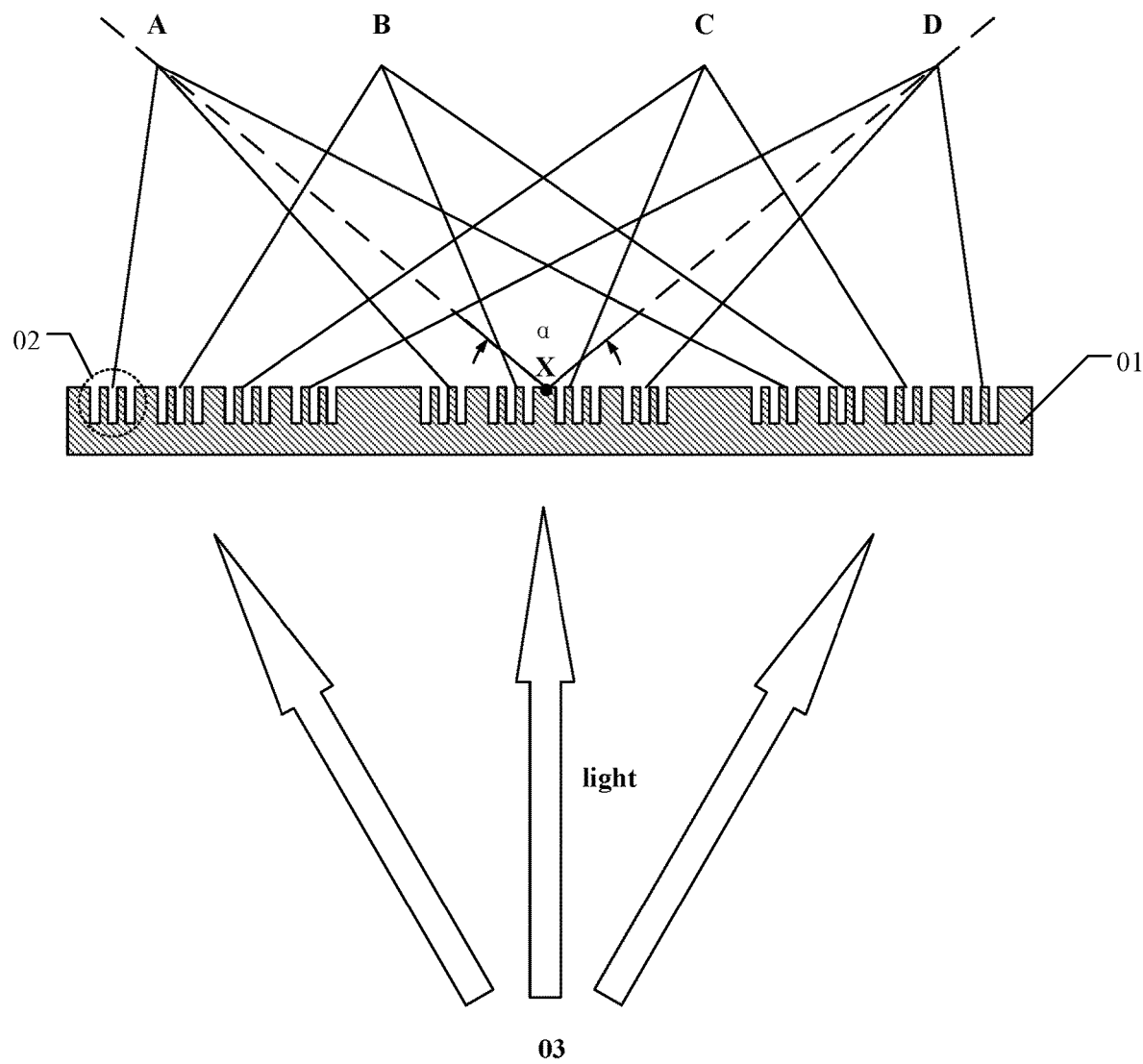
FIG. 1 illustrate a schematic diagram of an existing 3D display device.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted. It should be noted that the relative arrangement of the components and steps, the numerical expressions, and numerical values set forth in the exemplary embodiments do not limit the scope of the present disclosure unless it is specifically stated otherwise.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

FIG. 1 illustrate a schematic diagram of an existing 3D display device. As shown in FIG. 1, a plurality of transmissive gratings 02 are disposed on a transparent substrate 01. After being transmitted through each grating 02, the light emitted by a light source 03 is refracted and, accordingly, the propagation direction of the outgoing light is changed.

By adjusting the relative positions of the plurality of gratings 02, the light transmitted through the plurality of gratings 02 converges to a plurality of light-emitting points outside the grating. For example, as shown in FIG. 1, the light transmitted through the plurality of gratings 02 converges to a light-emitting point A, a light-emitting point B, a light-emitting point C and a light-emitting point D, respectively.

However, as shown in FIG. 1, the viewing angle α of the existing 3D display device is substantially small, and the point X is the center of the transparent substrate 01. The viewing angle α is often determined by a grating equation, and the grating equation is often affected by various parameters, such as the refractive index of the transparent substrate 01, the wavelength of the light, and the period of the grating 02. The viewing angle α of the existing 3D display device is approximately 90°, which is substantially small.

In addition, the grating 02 is often fabricated, for example, etched on the transparent substrate 01 having a high refractive index and, meanwhile, the transparent substrate 01 is often made of glass materials, which limits the processing technology and material selection.

The present disclosure provides an improved display device having wide viewing angle, but reduced fabrication complexity and cost.

Figure 2:
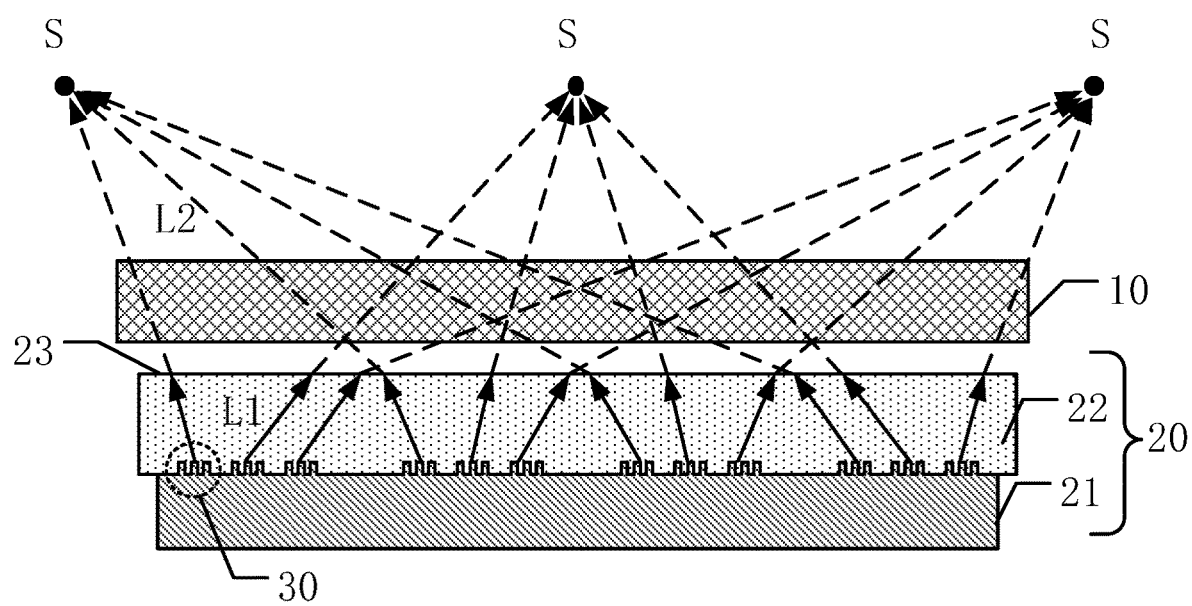
FIG. 2 illustrates a cross-sectional view of an exemplary display device consistent with disclosed embodiments.

FIG. 2 illustrates a cross-sectional view of an exemplary display device consistent with disclosed embodiments. As shown in FIG. 2, the display device may include a display panel 10 and a light modulation substrate 20 disposed opposite to each other. The light modulation substrate 20 may include a base layer 21 and a transparent dielectric layer 22. The base layer 21 may have a first surface facing the display panel 10 and an opposing second surface, and the transparent dielectric layer 22 may be disposed on the first surface of the base layer 21. That is, the transparent dielectric layer 22 may be disposed between the base layer 21 and the display panel 10.

In particular, the base layer 21 may include a plurality of reflective gratings 30. The transparent dielectric layer 22 may cover the base layer 21, in one embodiment, as shown in FIG. 2, the transparent dielectric layer 22 may completely cover the base layer 21. The transparent dielectric layer 22 may have a first surface facing the base layer 21 and an opposing second surface, and the second surface of the transparent dielectric layer 22 may be a transparent dielectric layer surface 23. The refractive index of the transparent dielectric layer 22 is n, and n>1. The outgoing light L2 of the display device may converge to a plurality of light-emitting points S outside the display device.

In the disclosed embodiments, the display device may include the display panel 10 and the light modulation substrate 20 disposed opposite to each other. The display panel 10 has a function of displaying images and/or videos. The light modulation substrate 20 may modulate the light propagation direction, such that the light desired for realizing the 3D display technology may be obtained.

In particular, the light modulation substrate 20 may include the base layer 21 and the transparent dielectric layer 22. The base layer 21 may include the plurality of reflective gratings 30, and light incident onto the reflective grating 30 may be reflected by the reflective grating 30 to form diffracted light L1. The diffracted light L1 may be refracted at the transparent dielectric layer surface 23 to form outgoing light L2. That is, the base layer 21 and the transparent dielectric layer 22 may cooperate with each other to modulate the light propagation direction, i.e. the propagation direction of the light incident onto the reflective grating 30.

In one embodiment, as shown in FIG. 2, the base layer 21 may have the first surface facing the display panel 10 and the opposing second surface, and the transparent dielectric layer 22 may be disposed on the first surface of the base layer 21. The outgoing light L2 emitted from the light modulation substrate 20 may work as a light source for the display panel 10.

In the disclosed display devices, the reflective grating 30 may be directly fabricated on the base layer 21 by various methods, such as photolithography or imprinting method. Compared with the gratings in the existing display panel, in the disclosed display devices, the transparent substrate may be on longer etched to form a grating, thereby reducing the fabrication complexity and fabrication cost.

In the disclosed display devices, the transparent dielectric layer 22 may be transparent, and may have a refractive index n which is greater than one. When the diffracted light L1 is incident onto the surface of the transparent dielectric layer 23, the diffracted light L1 may be refracted. Because the refractive index n of the transparent dielectric layer 22 is larger than 1, the exit angle of the outgoing light L2 may be substantially large. In particular, the exit angle of the outgoing light L2 may be larger than the incident angle of the diffracted light L1. By adjusting the refractive index n of the transparent dielectric layer 22, the outgoing light L2 with different exit angles may be obtained.

Thus, in the disclosed display device, through adjusting the refractive index n of the transparent dielectric layer 22, the outgoing light L2 with a substantially large exit angle may be obtained. Accordingly, the viewing angle of the display device may be widened, and large viewing angle display devices may be realized.

The transparent dielectric layer 22 may be made of any appropriate transparent medium, such as resin, glass, which is not limited by the present disclosure.

Further, the outgoing light L2 of the display device may converge to a plurality of light-emitting points S outside the display device. Each of the light-emitting points S may be an image, and the images at the plurality of light-emitting points S may converge to form a 3D image floating outside the display device. When viewers watch the display device, the human eyes may focus on the 3D image floating (i.e., the plurality of light-emitting points S) outside the display device, perceiving a real sense of depth, while the eye fatigue and the crosstalk between the light-emitting points S may be significantly suppressed In the display device shown in FIG. 2, only three light-emitting points S are drawn for illustrative purposes and are not intended to limit the scope of the present disclosure. In another embodiment, the number of the light-emitting points S may be greater than three. For example, the number of light-emitting points S may be one thousand. It would be understood that a larger number of light-emitting points S may lead to a higher resolution 3D image displayed by the display device.

In the discoed embodiments, the base layer may include a plurality of reflective gratings. Compared with the existing display devices, in the disclosed display devices, the transmissivity and the refractive index of the material of the base layer may be no longer limited, instead, various types of materials may be selected as the base layer. Moreover, the reflective grating may be fabricated directly on the base layer by, for example, photolithography or imprinting method. Compared with the gratings in the existing display panels, in the disclosed display devices, the transparent substrate made of glass may be on longer etched to form a grating, thereby reducing the fabrication complexity.

In addition, the disclosed display device may further comprise the transparent dielectric layer, the light incident onto the reflective grating may be reflected by the reflective grating to form m-th order diffracted light, in which at least one order diffracted light may be refracted at the transparent dielectric layer surface to form outgoing light. Through adjusting the refractive index of the transparent dielectric layer, the exit angle of the outgoing light may be substantially large, thereby increasing the viewing angle of the display device and enabling large viewing angle display devices.

Figure 3:
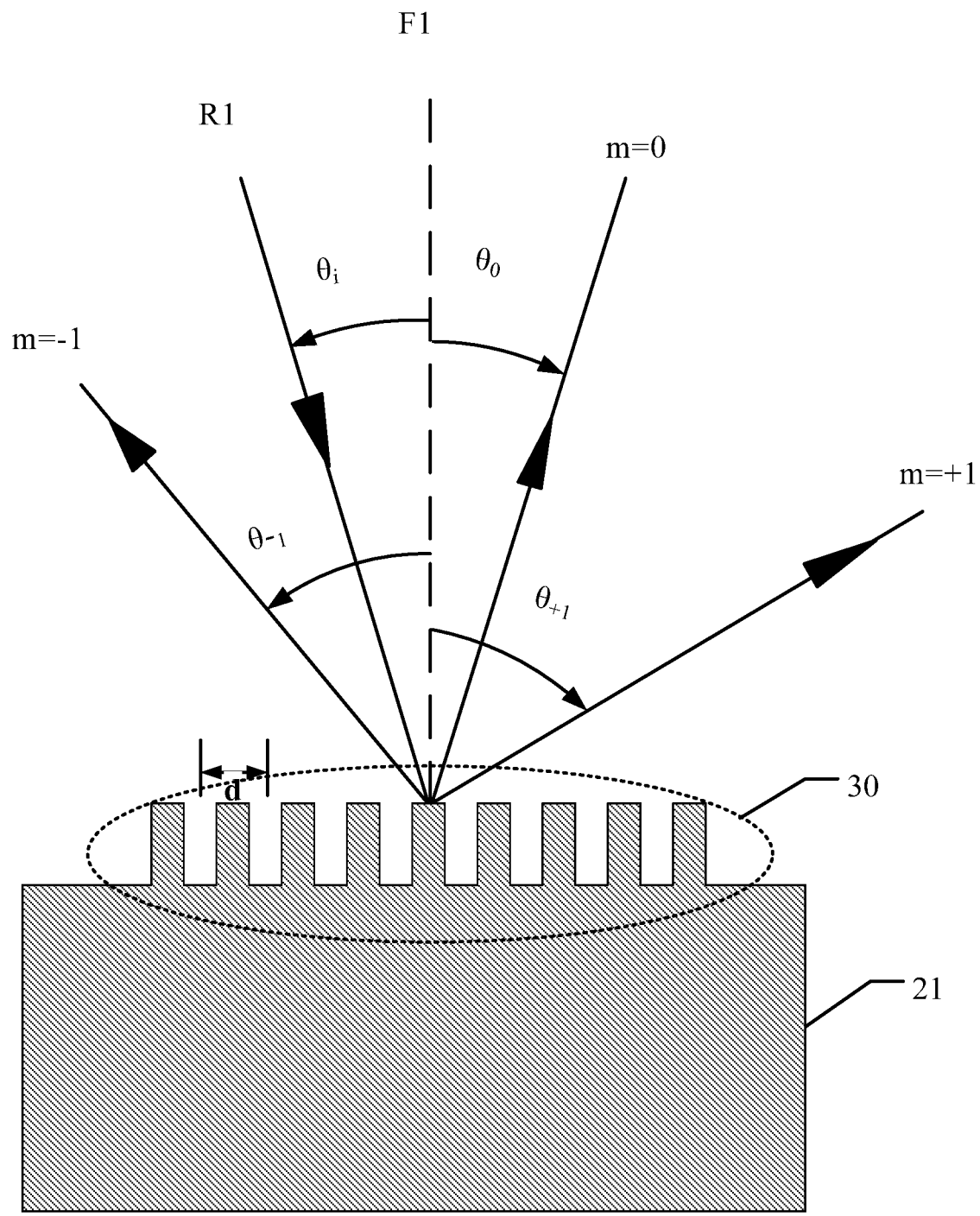
FIG. 3 illustrates a cross-sectional view of an exemplary reflective grating in an exemplary display device in FIG. 2 consistent with disclosed embodiments.

In one embodiment, referring to FIG. 2 and FIG. 3 (FIG. 3 illustrates a cross-sectional view of an exemplary reflective grating in an exemplary display device in FIG. 2 consistent with disclosed embodiments), the light incident onto the reflective grating 30 may be reflected by the reflective grating to form m-th order diffracted light L1, where m=0, ±1, ±2, . . . . At least one order diffracted light L1 may be refracted at the transparent dielectric layer surface 30 to form outgoing light L2, The structure of the reflective grating will be briefly described below.

The reflective grating includes multiply slits. The grating spectrum is produced by the combination of multi-slit interference and single-slit diffraction.

As shown in FIG. 3, the period of the reflective grating is d, and d is the distance between two adjacent slits of the reflective grating 30. The reflective grating 30 has a grating normal F1, and the grating normal F1 is perpendicular to the reflective grating 30.

When light R1 is incident onto the surface of the reflective grating 30, a reflection occurs and m-th order diffracted light is generated, where m=0, ±1, ±2, . . . . FIG. 3 shows the diffracted light when m=0, m=+1, and m=−1. That is, FIG. 3 shows the $0^{th}$ order diffracted light, the $+1^{st}$ order diffracted light, and the $-1^{st}$ order diffracted light. The angle between the 0th order diffracted light and the grating normal F1 is 00, the angle between the $+1^{st}$ order diffracted light and the grating normal F1 is $\theta_{+1}$, and the angle between the $-1^{st}$ order diffracted light and the grating normal F1 is $\theta_{-1}$. That is, the angle between the m-th order diffracted light and the grating normal F1 is $\theta_m$, and $\theta_m$ is the diffraction direction of the m-th order diffracted light. It should be noted that, FIG. 3 only shows the diffracted light when m=0, m=+1, and m=−1, which is for illustrative purposes, and is not intended to limit the scope of the present disclosure.

Further, in the reflective grating 30 shown in FIG. 3, the incident angle of the light R1 is $\theta_i$, and the angle $\theta_0$ between the $0^{th}$ order diffraction light and the grating normal F1 is equal to $\theta_i$. The diffraction direction $\theta_m$ of the m-th order diffracted light may be calculated according to a grating equation. The parameters of the grating equation include grating period d, the incident angle $\theta_i$ of the light R1, and the wavelength λ of the light R1. It should be noted that, the diffraction direction $\theta_m$ is not affected by the material of the reflective grating 30 and, thus, the transmissivity and the refractive index of the material of the base layer 21 may be no longer limited, instead, various materials may be selected as the material of the reflective grating 30.

In the reflective grating 30 shown in FIG. 3, the $0^{th}$ order diffracted light has the highest energy level, and the $+1^{st}$ order and the $-1^{st}$ order diffracted light each has a lower energy level than the $0^{th}$ order diffracted light. When m=±2, the energy level of the $+2^{nd}$ order and the $2^{nd}$ order diffracted light may be sustainably low and may be neglected. When m=±3, the energy level of the $+3^{rd}$ order and the $-3^{rd}$ order diffracted light is lower than the energy level of the $+2^{nd}$ order and the $-2^{nd}$ order diffracted light (i.e., m=±2), and so on.

In one embodiment, referring to FIG. 3, the reflective grating 30 may satisfies the following grating equation:

$$d*(\sin\theta_i + \sin\theta_m) = m*\lambda, \qquad \text{Eq. (1)}$$

where the reflective grating 30 may include a plurality of periods, d is the period of the reflective grating 30, $\theta_i$ is the incident angle of the light R1 at the reflective grating 30, $\theta_m$ is the reflective angle of the m-th order diffracted light, λ is the wavelength of the light R1, and $|m*\lambda/d|<2$.

According to Eq. (1), the angle $\theta_m$ of the m-th order diffracted light may be calculated through the following equation:

$$\theta = \arcsin(m*\lambda/d - \sin\theta_i), \qquad \text{Eq. (2)}$$

where $|m*\lambda/d| = \sin\theta_i + \sin\theta_m$, $\theta_i$ and $\theta_m$ may not be 90° at the same time and, thus, $|m*\lambda/d|<2$.

According to Eq. (2), by adjusting the wavelength λ of the light R1 and the period d of the reflective grating 30, the value of $\theta_m$ may be controlled, such that the diffraction direction (i.e., $\theta_m$) of the m-th order diffracted light may be obtained.

Figure 4:
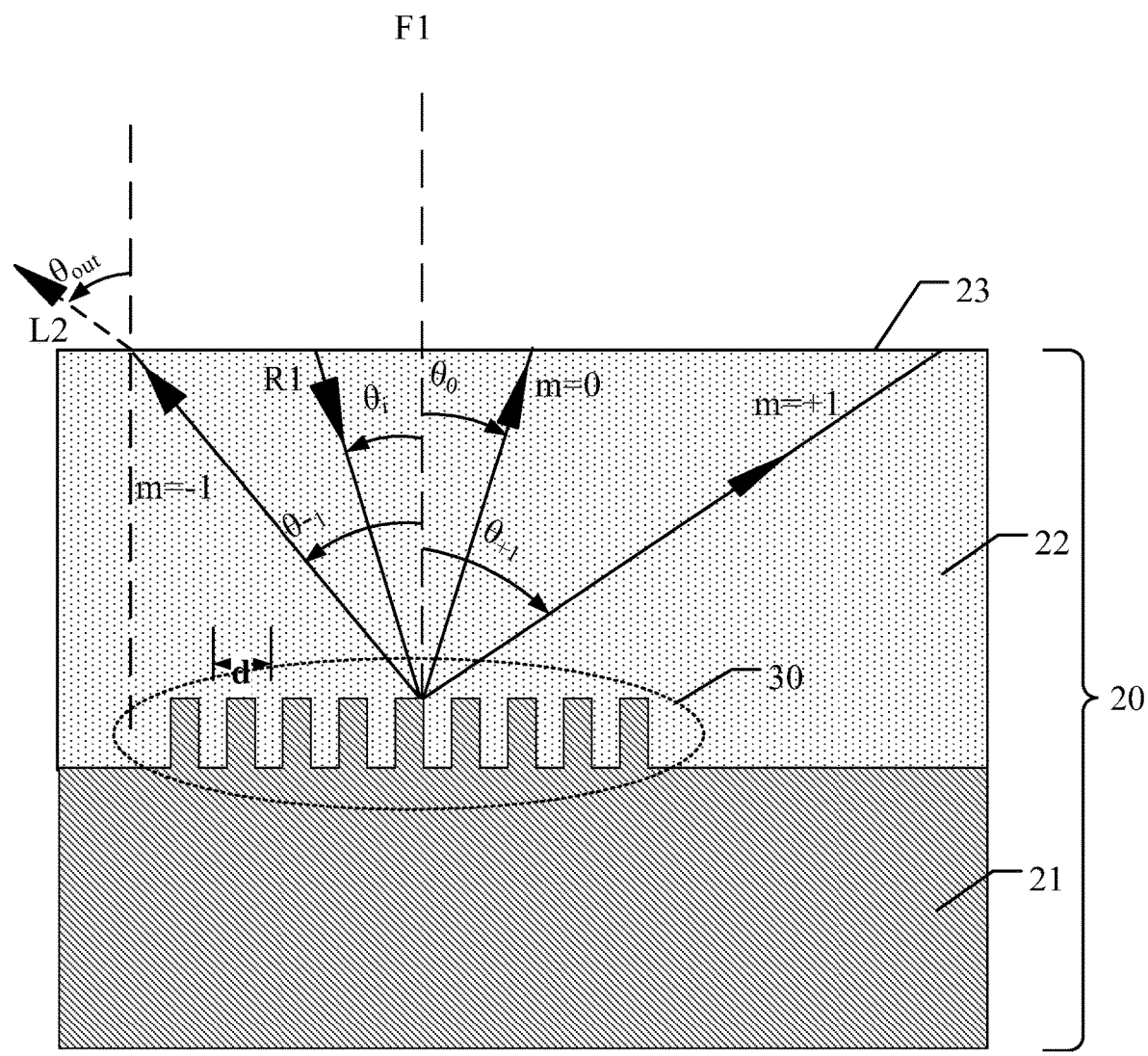
FIG. 4 illustrates a partial cross-sectional view of an exemplary light modulation substrate in an exemplary display device consistent with disclosed embodiments.

FIG. 4 illustrates a partial cross-sectional view of an exemplary light modulation substrate in an exemplary display device consistent with disclosed embodiments. To clearly illustrate the technical solution of the present disclosure, FIG. 4 only shows a partial structure of an exemplary light modulation substrate and, more particular, only illustrates one reflective grating 30.

As shown in FIG. 4, at least one order diffracted light (for example, the m-th order diffracted light) may be refracted at the transparent dielectric layer surface 23, and the refraction of the at least one order diffracted light satisfies the following question:

$$\sin\theta_{out} = \sin\theta_m * n, \qquad \text{Eq. (3)}$$

where $\theta_m$ is the incident angle of the m-th order diffracted light at the transparent dielectric layer surface 23; and $\theta_{out}$ is the exit angle of the outgoing light L2 after the m-th order diffracted light is refracted at the transparent dielectric layer surface 23.

According to Eq. (3), after the m-th order diffracted light is refracted on the transparent dielectric layer surface 23, the exit angle $\theta_{out}$ of the outgoing light L2 may be calculated as:

$$\theta_{out} = \arcsin(\sin\theta_m * n), \qquad \text{Eq. (4)}$$

Thus, through adjusting the incident angle $\theta_m$ of the m-th order diffracted light onto the transparent dielectric layer surface 23, as well as, the refractive index n of the transparent dielectric layer 22, $\theta_{out}$ may be configured to have different values. In particular, the maximum value of bout may be approximately 90°.

In the disclosed embodiments, the exit angle of the outgoing light L2 may reach a maximum value of about 90° and, accordingly, the viewing angle of the display device may be about 180°. Compared with the existing display devices, the viewing angle of the disclosed display device may be increased, thereby realizing a large viewing angle display device.

Figure 5:
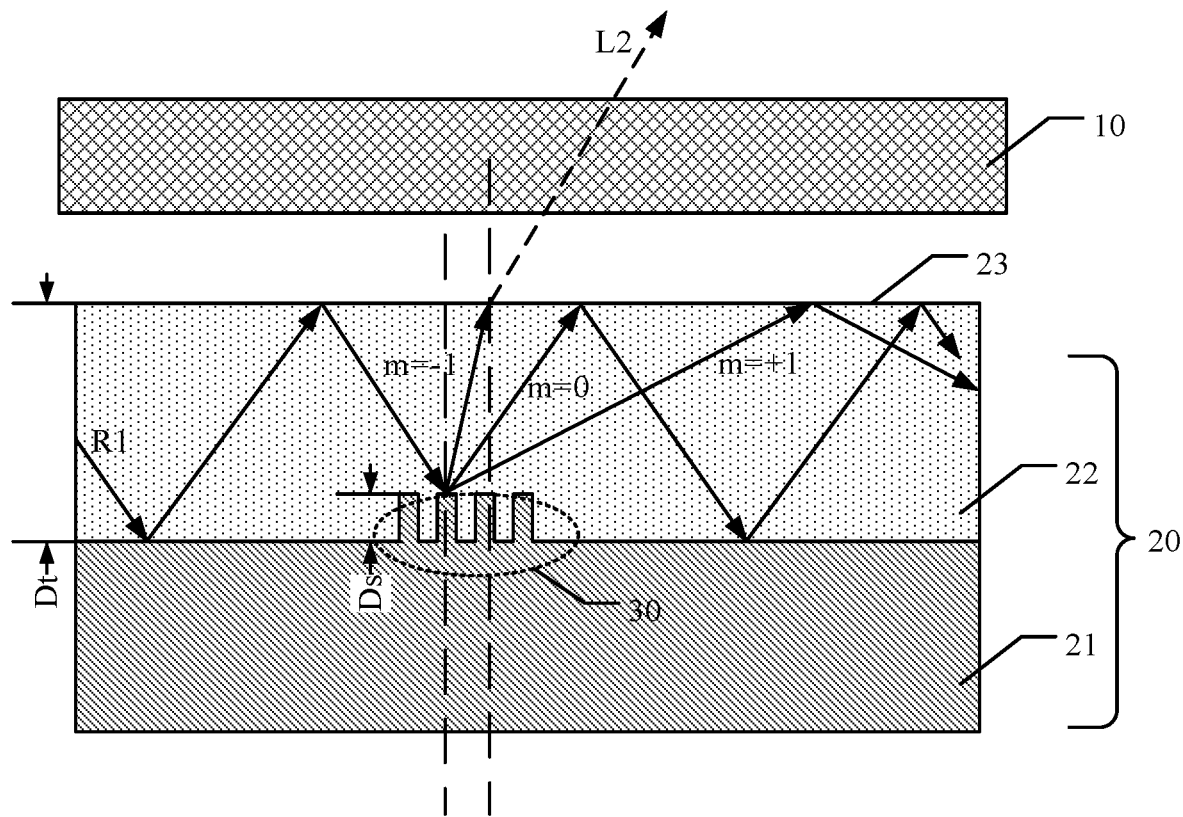
FIG. 5 illustrates a partial cross-sectional view of another exemplary display device consistent with disclosed embodiments.

FIG. 5 illustrates a partial cross-sectional view of another exemplary display device consistent with disclosed embodiments. The similarities between FIG. 4 and FIG. 5 are not repeated here, while certain differences may be explained. To clearly illustrate the technical solution of the present disclosure, FIG. 5 only shows a partial structure of an exemplary light modulation substrate and, more particular, only illustrates one reflective grating 30.

As shown in FIG. 5, the $-1^{st}$ order diffracted light may be refracted on the transparent dielectric layer surface 23 to form the outgoing light L2. In the refractive grating 30, the $0^{th}$ order diffracted light has the highest energy level, and the $+1^{st}$ order and the $-1^{st}$ order diffracted light each has a lower energy level than the $0^{th}$ order diffracted light. Accordingly, when m=±2, the energy level of the $+2^{nd}$ order and the $-2^{nd}$ order diffracted light may be sustainably low and may be neglected. When m=±3, the energy level of the $+3^{rd}$ order and the $-3^{rd}$ order diffracted light is lower than the energy level of the $+2^{nd}$ order and the $-2^{nd}$ order diffracted light (i.e., m=±2), and so on.

Thus, in the disclosed embodiments, by adjusting the incident angle of the light R1 and the refractive index n of the transparent dielectric layer 22, the $+1^{st}$ order diffracted light may be totally internally reflected in the transparent dielectric layer 22, while the $-1^{st}$ order diffracted light may be refracted at the transparent dielectric layer surface 23 to form the outgoing light L2. The energy levels of the $\pm 2^{nd}$ order diffracted light and the diffracted light above the ±2 order may be substantially low and, thus, may be neglected. Through configuring the $-1^{st}$ order diffracted light having a higher energy level to be refracted at the transparent dielectric layer surface 23 to form the outgoing light L2, the outgoing light L2 may provide a light source for the display panel 10 to display 3D images, and the utilization rate of the light may be substantially high.

Further, referring to FIG. 5, the $0^{th}$ order diffracted light may be totally internally reflected in the transparent dielectric layer 22. In one embodiment, as shown in FIG. 5, along the propagation direction of the light R1, the $0^{th}$ order diffracted light may be configured to undergo multiple total internal reflection in the transparent dielectric layer 22. Because the $0^{th}$ order diffracted light has the highest energy level, through configuring the $0^{th}$ order diffracted light to undergo multiple total internal reflection in the transparent dielectric layer 22, light in the transparent dielectric layer 22 may be substantially uniform.

In another embodiment, the $+1^{st}$ order diffracted light may also be configured to undergo multiple total internal reflection in the transparent dielectric layer 22. Because the $+1^{st}$ order diffracted light has a substantially high energy level, configuring the $+1^{st}$ order diffracted light to undergo multiple total internal reflection in the transparent dielectric layer 22, light in the transparent dielectric layer 22 may be more uniform.

Thus, the $0^{th}$ and $+1^{st}$ order diffracted light which is propagating in the transparent dielectric layer 22 may function as the incident light R1 of the remaining reflective grating 30 and, thus, generate other diffracted light on the remaining reflective grating 30, and then refracted at the transparent dielectric layer surface 23 to form the remaining portion of the light L2.

That is, the $-1^{st}$ order diffracted light having a higher energy level may be refracted at the transparent dielectric layer surface 23 to form a portion of the outgoing light L2, and the $0^{th}$ and $+1^{st}$ order diffracted light which is propagating in the transparent dielectric layer 22 may generate other diffracted light on the remaining reflective grating 30, and then refracted at the transparent dielectric layer surface 23 to form the remaining portion of the light L2.

In one embodiment, as shown in FIG. 5, the $0^{th}$ order diffracted light may undergo multiple total internal reflection in the transparent dielectric layer 22, thereby functioning as the incident light R1 of the remaining reflective grating 30, which may lead to a substantially high utilization rate of the light.

In certain embodiments, the display device may also include a light source. The light source may be disposed in a couple-in area of the transparent dielectric layer, i.e., an area through which light outside the transparent dielectric layer is coupled into the transparent dielectric layer.

In particular, the couple-in area may be configured at a plurality of locations. Certain exemplary arrangement of the couple-in area will be explained below.

Figure 6:
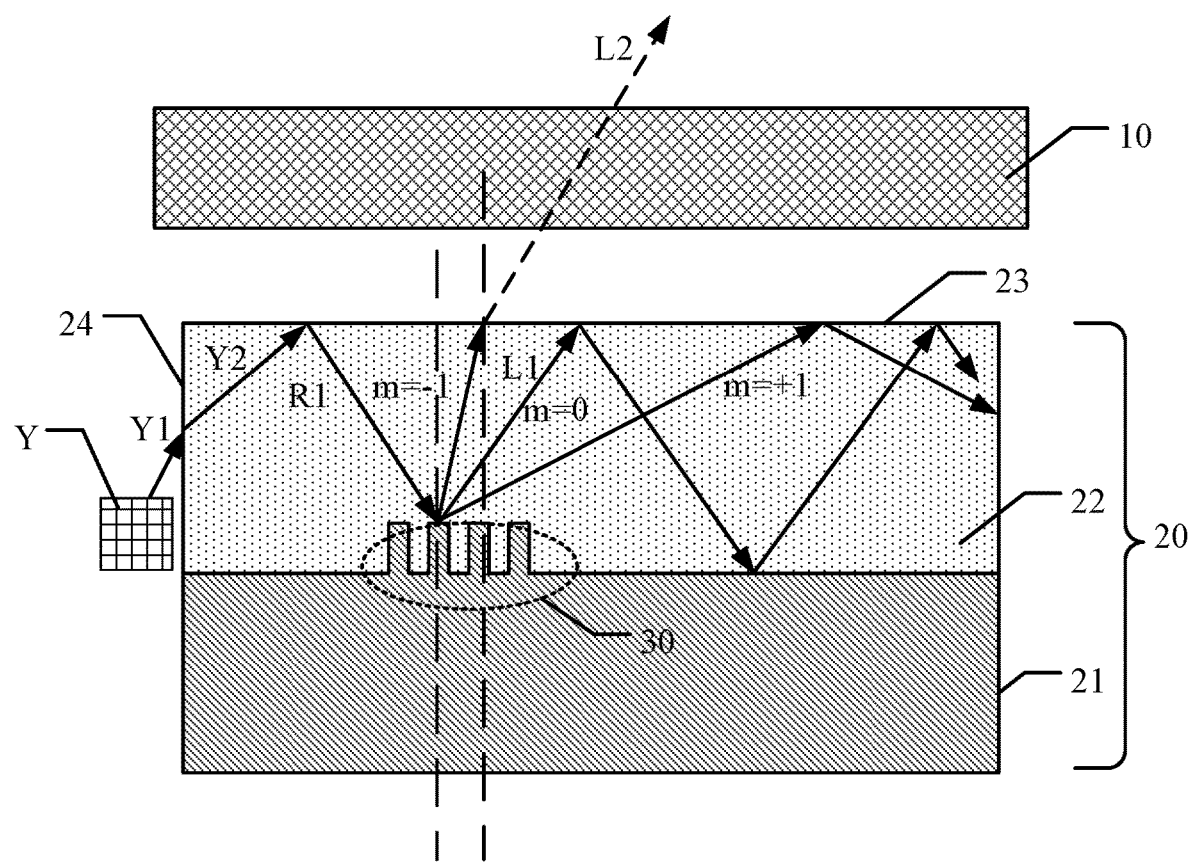
FIG. 6 illustrates a partial cross-sectional view of another exemplary display device consistent with disclosed embodiments.

FIG. 6 illustrates a partial cross-sectional view of another exemplary display device consistent with disclosed embodiments. To clearly illustrate the technical solution of the present disclosure, FIG. 6 only shows a partial structure of an exemplary light modulation substrate and, more particular, only illustrates one reflective grating 30.

As shown in FIG. 6, a light source Y may be disposed on a side surface 24 of the transparent dielectric layer 22, and the side surface 24 of the transparent dielectric layer 22 may be configured as the couple-in area. Light Y1 emitted by the light source Y may enter the transparent dielectric layer 22 from the side surface 24 of the transparent dielectric layer 22. When entering the transparent dielectric layer 22, the light Y1 may be refracted at the side surface 24 of the transparent dielectric layer 22 to generate refracted light Y2.

The refracted light Y2 propagating in the transparent dielectric layer 22 may be totally internally reflected on the transparent dielectric layer surface 23. That is, the refracted light Y2 may be the light R1, which is reflected by the reflective grating 30 to form m-th order diffracted light L1. In one embodiment, the refracted light Y2 propagating in the transparent dielectric layer 22 may undergo multiple total internal reflection, in which at least one beam of the refracted light Y2 may be reflected at the reflective grating 30 to form the m-th order diffracted light L1.

Figure 7:
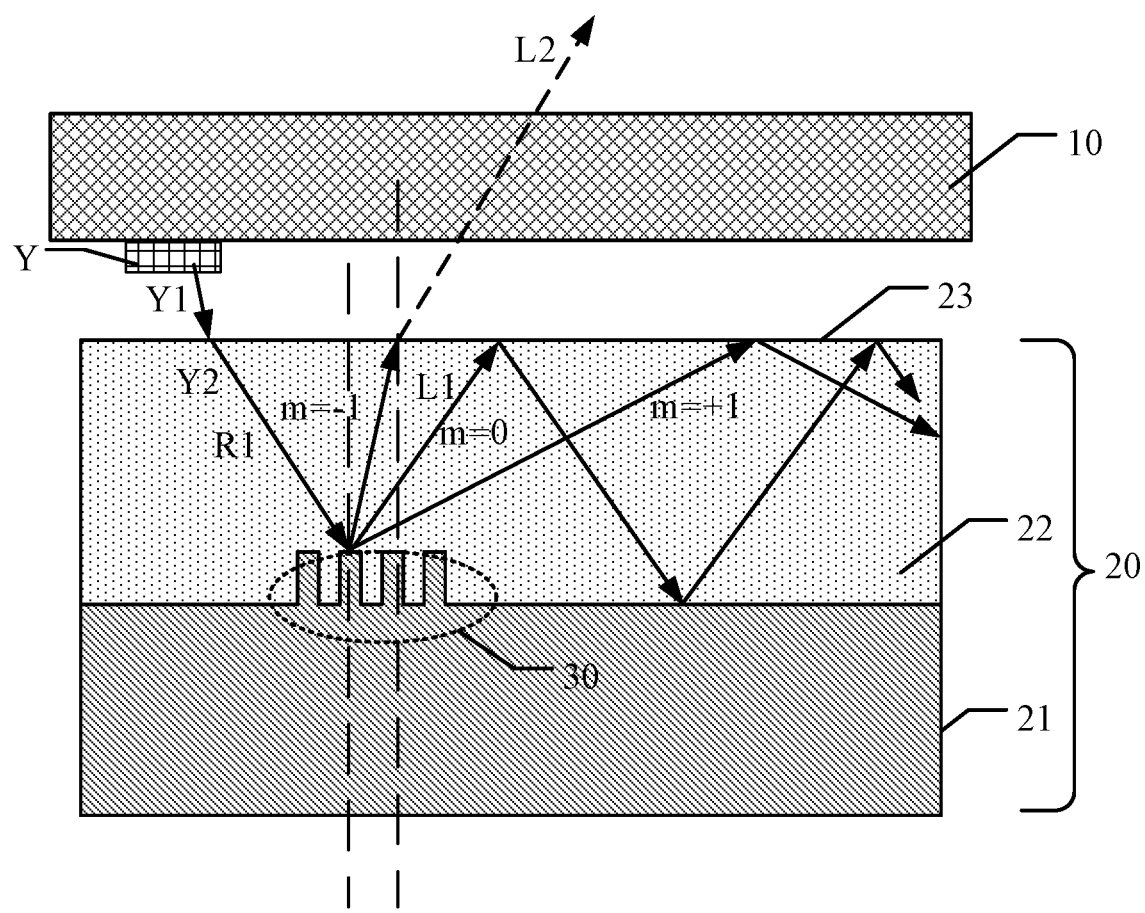
FIG. 7 illustrates a partial cross-sectional view of another exemplary display device consistent with disclosed embodiments.

FIG. 7 illustrates a partial cross-sectional view of another exemplary display device consistent with disclosed embodiments. To clearly illustrate the technical solution of the present disclosure, FIG. 7 only shows a partial structure of an exemplary light modulation substrate and, more particular, only illustrates one reflective grating 30.

As shown in FIG. 7, the transparent dielectric layer 22 may have a first surface facing the base layer 21 and an opposing second surface facing the display panel 10, and the second surface of the transparent dielectric layer 22 may be the transparent dielectric layer surface 23. The light source Y may be disposed on a side of the transparent dielectric layer surface 23, for example, between the display panel 10 and the transparent dielectric layer surface 23. That is, the transparent dielectric layer surface 23 may be configured as the couple-in area. Light Y1 emitted by the light source Y may enter the transparent dielectric layer 22 from the transparent dielectric layer surface 23. When entering the transparent dielectric layer 22, the light Y1 may be refracted at the transparent dielectric layer surface 23 to generate refracted light Y2.

The refracted light Y2 propagating in the transparent dielectric layer 22 may directly work as the light R1, which is reflected by the reflective grating 30 to form m-th order diffracted light L1. In one embodiment, the refracted light Y2 propagating in the transparent dielectric layer 22 may undergo multiple total internal reflection, in which at least one beam of the refracted light Y2 may be reflected at the reflective grating 30 to form the m-th order diffracted light L1.

Figure 8:
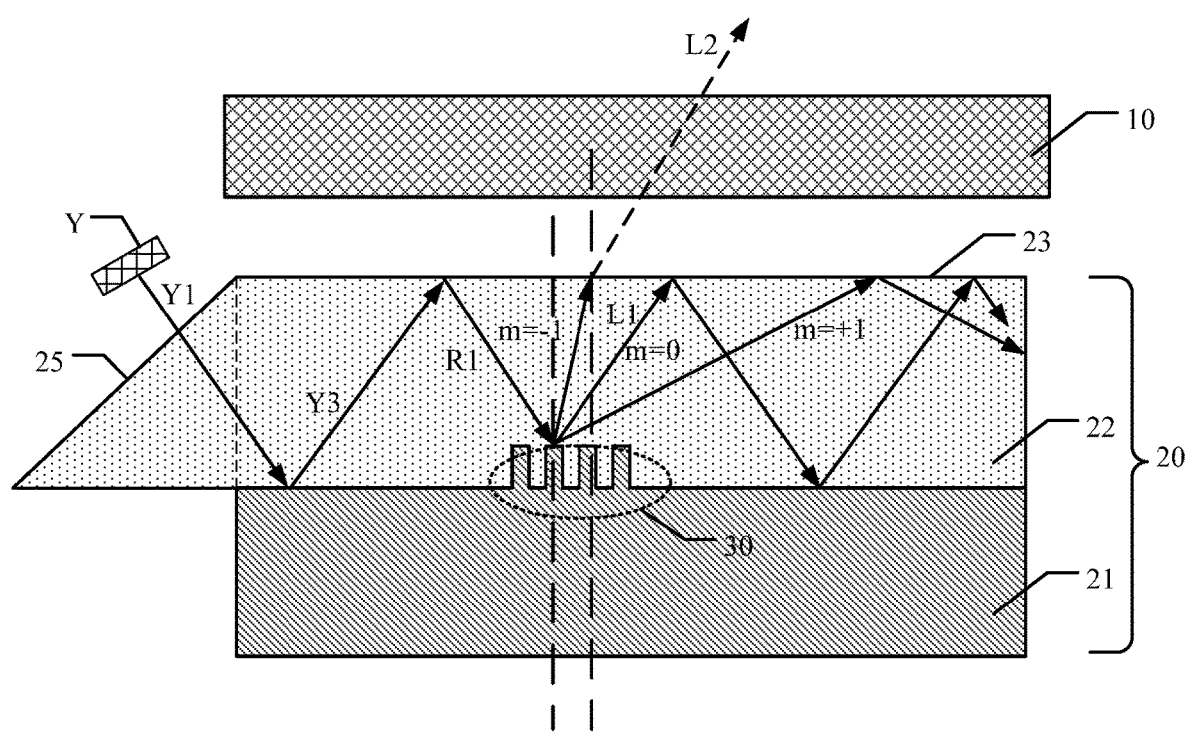
FIG. 8 illustrates a partial cross-sectional view of another exemplary display device consistent with disclosed embodiments.

FIG. 8 illustrates a partial cross-sectional view of another exemplary display device consistent with disclosed embodiments. To clearly illustrate the technical solution of the present disclosure, FIG. 8 only shows a partial structure of an exemplary light modulation substrate and, more particular, only illustrates one reflective grating 30.

As shown in FIG. 8, the transparent dielectric layer 22 may have an inclined side surface 25, which may be configured as the couple-in area. Through adjusting the angle of the inclined side surface 25, the light Y1 emitted by the light source Y may be perpendicularly incident onto the inclined side surface 25. The light source Y may be disposed on a side of the inclined side surface 25. The light Y1 emitted from the light source Y may be perpendicularly incident onto the inclined side surface 25, and enter the transparent dielectric layer 22. After entering the transparent dielectric layer 22, the light Y1 may undergo multiple total internal reflection, and generate the reflected light Y3.

The light Y3 may be the light R1, which is reflected by the reflective grating 30 to form m-th order diffracted light L1. In one embodiment, the refracted light Y3 propagating in the transparent dielectric layer 22 may undergo multiple total internal reflection, in which at least one beam of the refracted light Y3 may be reflected at the reflective grating 30 to form the m-th order diffracted light L1.

It should be noted that, the display device shown in FIG. 6, FIG. 7 and FIG. 8 only illustrates certain exemplary arrangements of the light source. In another embodiment, the light source may be disposed at other appropriate positions in the display device, which is not limited by the present disclosure.

In certain embodiments, the plurality of reflective gratings 30 may include X number of grating groups, where X is a positive integer and X≥3. Each grating group may include p number of reflective gratings, and the outgoing light of the display device may converge to p number of light-emitting points outside the display device, where p is a positive integer and p≥1. A corresponding structure is shown in FIG. 9.

Figure 9:
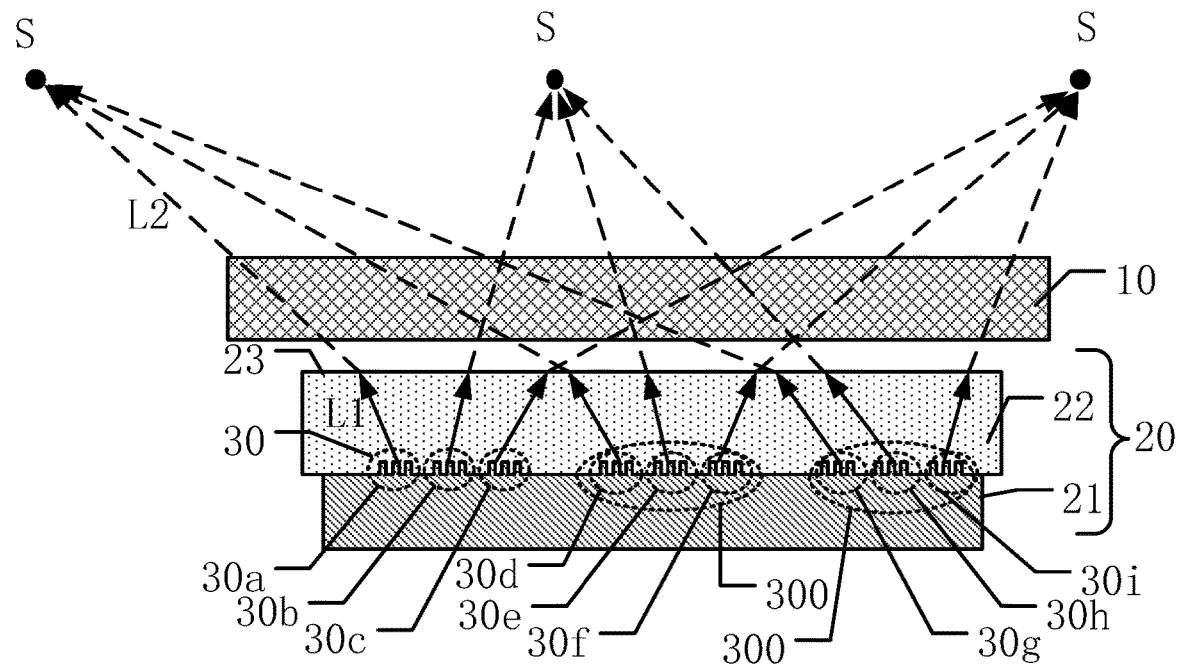
FIG. 9 illustrates a cross-sectional view of another exemplary display device consistent with disclosed embodiments.

FIG. 9 illustrates a cross-sectional view of another exemplary display device consistent with disclosed embodiments. As shown in FIG. 9, in the display device, X=3 and p=3. That is, the plurality of reflective gratings may include three grating groups 300, and each grating group 300 may include three reflective gratings 30. The outgoing light L2 of the display device may be converged to three light-emitting points outside the display device. The display device which includes three grating groups 300 and each grating group 300 includes three reflective gratings 30 (i.e., X=3 and p=3) is for illustrative purposes, and is not intended to limit the scope of the present disclosure.

In another embodiment, the number of the grating groups 300 may be greater than three, for example, the number of the grating groups 300 may be four or more. A larger number of grating groups 300 may lead to a stronger three-dimensional sense of the 3D image displayed by the display device.

The p number of grating 30 in each grating group 300 may be configured to generate diffracted light L1 with different directions, thereby generating refracted light L2 with different directions. The p number beams of the refracted light L2 generated by the grating group 300 may converge to different light-emitting points S, respectively. That is, each light-emitting point S may be converged by refracted light L2 in X number of different directions.

It should be noted that, the direction of the X refracted light beams L2 converged at each light-emitting point S may be determined according to the specific requirements of the display device. After determining the directions of the X refracted light beams L2, i.e., after determining the exit angle $\theta_{out}$ of the outgoing light L2 after the m-th order diffracted light is reflected at the transparent dielectric layer surface 23, $\theta_m$ may be calculated according to Eq. (3) sin $\theta_{out}$=sin $\theta_m$*n, where $\theta_m$ is the incident angle of the m-th order diffracted light onto the transparent dielectric layer surface 23. That is, the incident angle of the diffracted light beams L1 (onto the transparent dielectric layer surface 23) which are respectively corresponding to the X refracted light beams L2 may be determined.

The directions of the X refracted light beams L2 are different, i.e., the values of sin $\theta_{out}$ are different, while the refractive index n of the transparent dielectric layer is fixed, thus, the values of sin $\theta_m$ are different. In other words, the directions of the diffracted light beams L1 corresponding to the X refracted light beams L2 are also different, i.e. the reflective angle $\theta_m$ of the diffracted light beams L1 corresponding to the X refracted light beams L2 are different.

According to Eq. (2) $0=\arcsin(m*\lambda/d-\sin \theta_i)$, $\theta_m$ is the reflective angle of the m-th order diffracted light. Provided that the wavelength λ of the light is the same and the light incident angle $\theta_i$ onto the reflective grating 30 is the same, the period θ of the reflective grating 30 may be adjusted to obtain different values of $\theta_m$.

In one embodiment, the periods d of the plurality of reflective gratings 30 may not completely be the same. Depending on the specific display requirement of the display device, the period d of each reflective grating 30 may be calculated according to the above derivation process.

For example, referring to FIG. 9, in the display device shown in FIG. 9, a reflective grating 30a, a reflective grating 30b, a reflective grating 30c, a reflective grating 30d, a reflective grating 30e, a reflective grating 30f, a reflective grating 30g, a reflective grating 30h, a reflective grating 30i each may have a different period.

Figure 10:
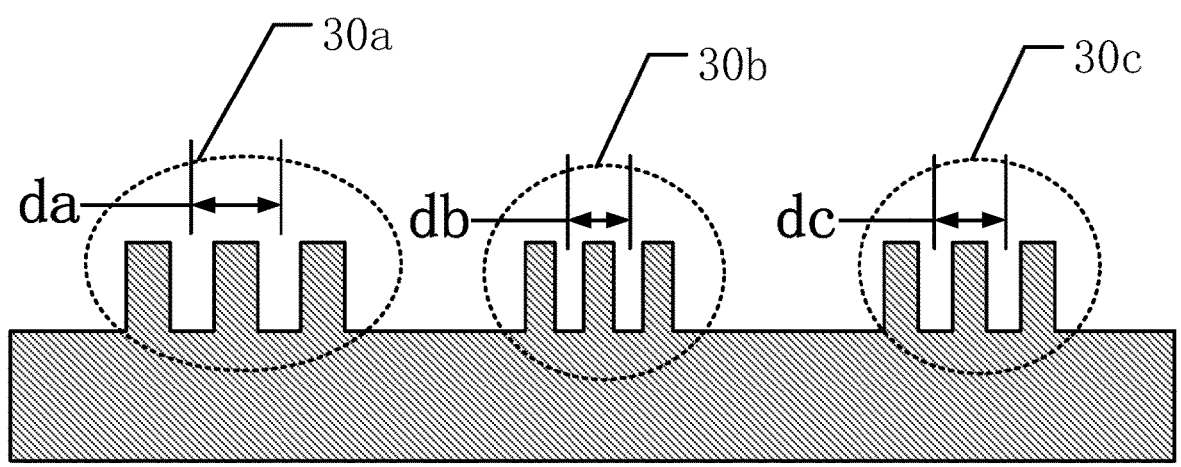
FIG. 10 illustrates a cross-sectional view of exemplary reflective gratings in an exemplary display device in FIG. 9 consistent with disclosed embodiments.

FIG. 10 illustrates a cross-sectional view of the reflective gratings 30a, 30b and 30c in an exemplary display device in FIG. 9 consistent with disclosed embodiments. As shown in FIG. 10, the period of the reflective grating 30a is da, the period of the reflective grating 30b is db, and the period of the reflective grating 30c is dc. In one embodiment, da≠db≠dc. That is, the reflective grating 30a, the reflective grating 30b, and the reflective grating 30c each may have a different period. It should be noted that, the specific value of the period d of the plurality of reflective gratings 30 may be any appropriate value, which is not limited by the present disclosure.

One of the differences between a 2D image and a 3D image is that the 3D image has a 3D sense. The light forming the 2D image may only have a single direction, while the light forming the 3D image may have multiple different direction. The human eyes may be able to observe the 3D image from different angles and positions, thereby generating a 3D perception. When the refracted light L2 which is converged at one light-emitting point S has more directions, the human eyes may be able to observe the image at the light-emitting point S from more angles, and the stereoscopic effect of the image at the light-emitting point S may be enhanced. Thus, the larger the number of the grating groups 300, the stronger the 3D perception of the 3D image displayed by the display device.

In FIG. 9, each of the grating groups 300 may include three reflective gratings 30, which is for illustrative purposes and is not intended to limit the scope of the present disclosure. In another embodiment, each grating group 300 may include one or two reflective gratings 30. In another embodiment, each grating group 300 may include four or more reflective gratings 30.

When the number of the reflective gratings 30 included in each grating group 300 increases, the number of the light-emitting points S, where the light emitted from the display device converges to outside the display device, may also be increased. Accordingly, the resolution of the 3D image displayed by the display device may be increased, and the display performance may be improved.

Figure 11:
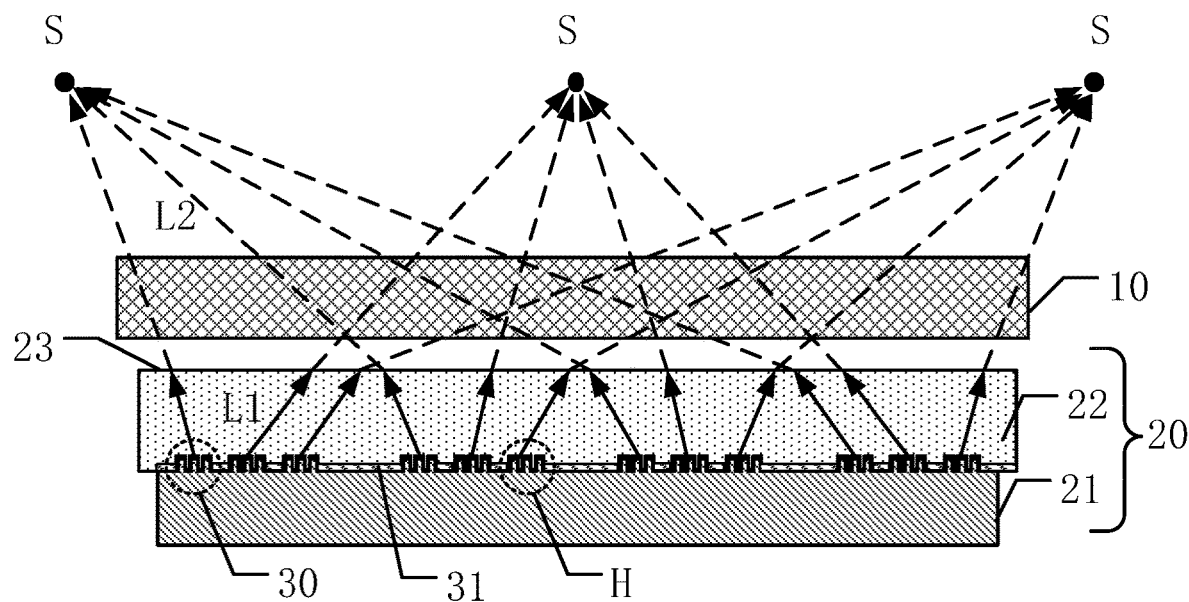
FIG. 11 illustrates a cross-sectional view of another exemplary display device consistent with disclosed embodiments.

FIG. 11 illustrates a cross-sectional view of another exemplary display device consistent with disclosed embodiments. The similarities between FIG. 2 and FIG. 11 are not repeated here, while certain differences may be explained.

As shown in FIG. 11, the base layer 21 may have a first surface facing the display panel 10 and an opposing second surface, and the plurality of reflective gratings may be disposed on the first surface of the base layer 21. Thus, the diffracted light, which is generated by reflecting the light incident onto the reflective grating 30, may directly enter the transparent dielectric layer 22, thereby improving the utilization rate of light.

Figure 12:
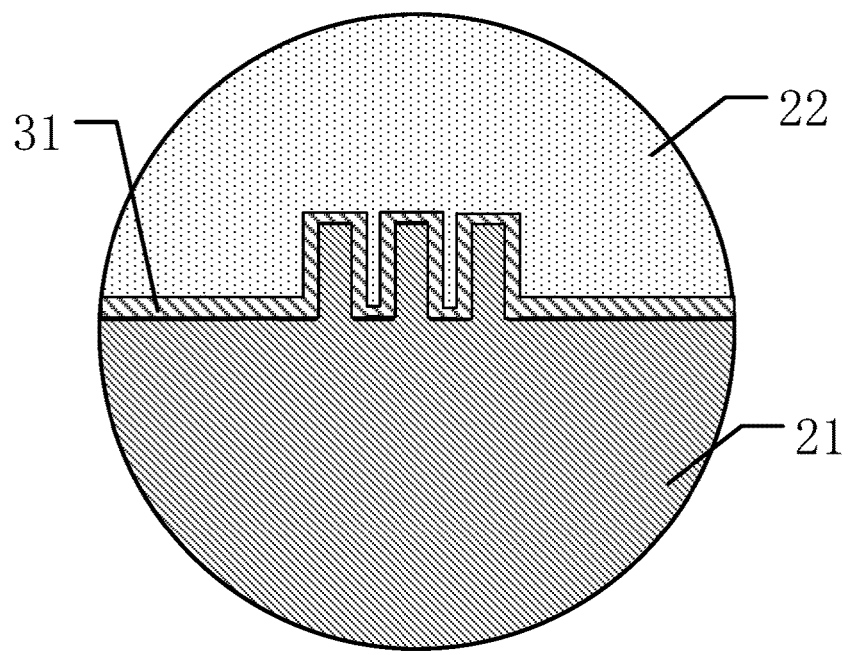
FIG. 12 illustrates a partial enlarged view of a region H in an exemplary display device in FIG. 11 consistent with disclosed embodiments.

In one embodiment, to improve the utilization rate of light, a reflective layer may be disposed on the first surface of the base layer, i.e., the surface facing the display panel 10. A corresponding structure is shown in FIG. 12. FIG. 12 illustrates a partial enlarged view of a region H in an exemplary display device in FIG. 11 consistent with disclosed embodiments;

As shown in FIG. 12, the reflective gratings may be disposed on the first surface of the base layer 21, i.e., between the base layer 21 and the transparent dielectric layer 22. A reflective layer 31 may be disposed on the first surface of the base layer, i.e., the surface facing the display panel 10. The surface of the reflective grating 30 may also be provided with the reflective layer 31. The reflective layer 31 may reflect most of the light, which is incident onto the second surface of the base layer 21, into the transparent dielectric layer 22, thereby further improving the utilization rate of light.

In one embodiment, the material of the reflective layer 31 may include metal, such as aluminum, silver. For example, the reflective layer 31 may be made of aluminum. The reflection coefficient of aluminum is substantially large in the near infrared and visible region and, more particular, the reflection coefficient of aluminum is almost constant. More importantly, in the ultraviolet region, the reflection coefficient of aluminum is larger than the reflection coefficient of gold and silver. In addition, aluminum is relatively soft and easy to be carved. Thus, aluminum may be more suitable to be fabricated as the reflective grating.

The thickness Ds of the reflective grating, as shown in FIG. 5, may be determined according to various application scenarios. In certain embodiments, the thickness Ds of the reflective grating may be configured to be approximately 50 nm≤DS≤1000 nm, such that the light extraction efficiency of the display device may be improved.

The thickness Dt of the transparent dielectric layer, as shown in FIG. 5, may be determined according to various application scenarios. In certain embodiments, the thickness Dt of the transparent dielectric layer may be configured to be approximately 10≤Dt≤5 mm, where λ is the wavelength of light. As shown in FIG. 5, the wavelength of the light R1 is λ, and the thickness Dt of the transparent dielectric layer 22 may be not less than 10λ. When the thickness Dt of the transparent dielectric layer 22 is too small, a fluctuation may occur, which may affect the normal operation of the reflective grating. When the thickness Dt of the transparent dielectric layer 22 is too large, the times of the total internal reflection of the light R1 may be reduced in the transparent dielectric layer 22. As a result, the light uniformity in the transparent dielectric layer 22 may be affected, and the display performance of the display device may be degraded.

In the disclosed embodiments, the display panel 10 may be a plasma display panel, a field emission display panel, a light-emitting diode (LED) display panel, an organic light-emitting diode (OLED) display panel, a liquid crystal display panel, a quantum dots (QDs) display panel, an electrophoretic display panel, etc. Further, the display panel may include any appropriate type of display panels which are not limited by the present disclosure.

Figure 13:
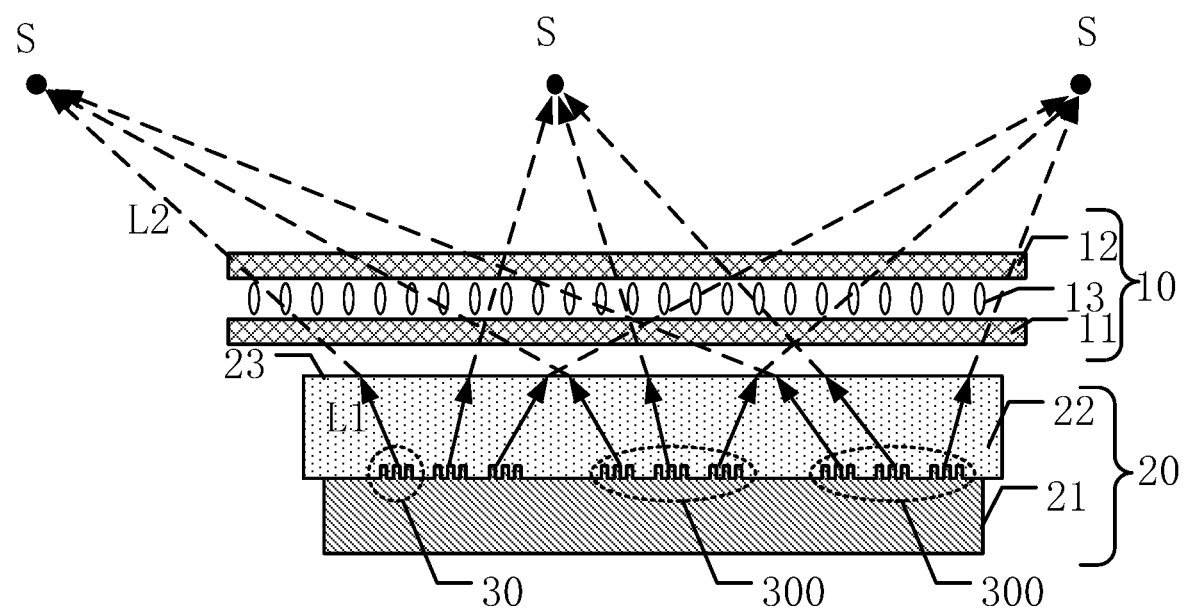
FIG. 13 illustrates a cross-sectional view of another exemplary display device consistent with disclosed embodiments.

In one embodiment, the display panel 10 may be a LCD panel, and a corresponding structure is shown in FIG. 13. FIG. 13 illustrates a cross-sectional view of another exemplary display device consistent with disclosed embodiments.

As shown in FIG. 13, the display panel 10 may be a LCD panel. In particular, the display panel 10 may include a first substrate 11 and a second substrate 12 opposite to each other, and a liquid crystal layer 13 sandwiched between the first substrate 11 and the second substrate 12. In one embodiment, the first substrate 11 may be an array substrate, and the second substrate 12 may be a color film substrate. In another embodiment, the first substrate 11 is a color film substrate and the second substrate 12 may be an array substrate. The first substrate 11 and the second substrate 12 may have any appropriate structures, which is not limited by the present disclosure.

Figure 14:
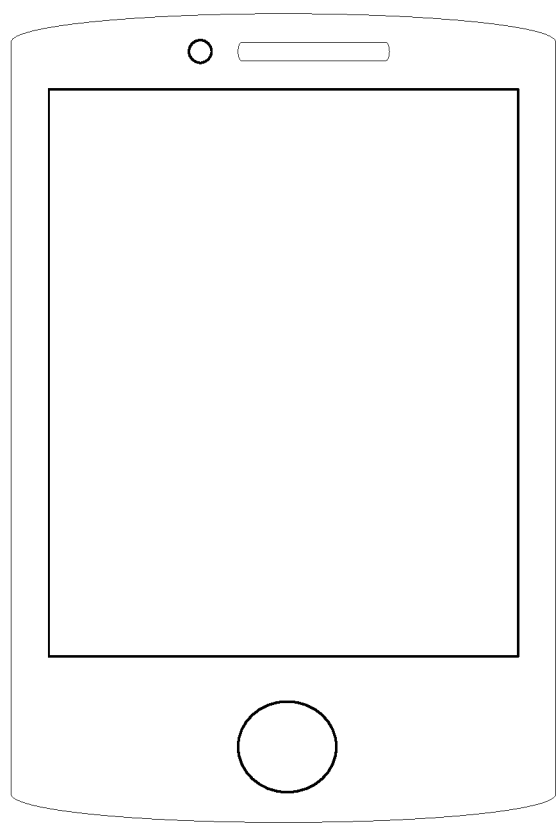
FIG. 14 illustrates a schematic diagram of an exemplary display device consistent with disclosed embodiments.

Further, the disclosed display device may be a terminal display device. FIG. 14 illustrates a schematic diagram of an exemplary display device consistent with disclosed embodiments. As shown in FIG. 14, the display device may be a cell phone 1000 having a function of displaying 3D images and/or videos. In addition, the display device may also include various terminal device, such as a television, a tablet PC, a smart wearable device, etc., which is not limited by the present disclosure.

The present disclosure provides a display device, in which the base layer may include a plurality of reflective gratings. Compared with the existing display devices, in the disclosed display devices, the transmissivity and the refractive index of the material of the base layer may be no longer limited, instead, various types of materials may be selected as the base layer. Moreover, the reflective grating may be fabricated directly on the base layer by, for example, photolithography or imprinting method. Compared with the gratings in the existing display panels, in the disclosed display devices, the transparent glass substrate may be on longer etched to form the grating, thereby reducing the fabrication complexity and fabrication cost.

In addition, the disclosed display device may further comprise the transparent dielectric layer, the light incident onto the reflective grating may be reflected by the reflective grating to form m-th order diffracted light, in which at least one order diffracted light may be refracted at the transparent dielectric layer surface to form outgoing light. Through adjusting the refractive index of the transparent dielectric layer, the exit angle of the obtained outgoing light may be substantially large, thereby increasing the viewing angle of the display device and enabling large viewing angle display devices.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A display device, comprising:
a display panel; and
a light modulation substrate disposed opposite to the display panel, wherein:
the light modulation substrate includes a base layer and a transparent dielectric layer covering the base layer,
the base layer has a first surface facing the display panel and an opposing second surface, and the transparent dielectric layer is disposed on the first surface of the base layer,
a plurality of reflective gratings are disposed on the base layer, the plurality of reflective gratings include X number of grating groups arranged along a horizontal direction of the base layer, and each grating group includes p number of reflective gratings, wherein X is a positive integer greater than or equal to 3 and p is a positive integer greater than 1, and the X number of grating groups have different periods so as to cause different light diffraction directions by the X number of grating groups to achieve a 3D perception, each grating group is separated from each other by a distance greater than the largest period of the X number of grating groups and filled by the transparent dielectric layer,
the transparent dielectric layer has a first surface facing the base layer and an opposing second surface, and the second surface of the transparent dielectric layer is a transparent dielectric layer surface, and
the transparent dielectric layer has a refractive index of n, and n>1, wherein outgoing light of the display device converges to p number of light-emitting points outside the display device.

2. The display device according to claim 1, wherein:
light incident onto a reflective grating is reflected by the reflective grating to form m-th order diffracted light, where m=0, ±1, ±2, . . . ; and
at least one order diffracted light is refracted at the transparent dielectric layer surface to form the outgoing light.

3. The display device according to claim 2, wherein:
the reflective grating satisfies the following grating equation:

$$d*(\sin\theta_i + \sin\theta_m) = m*\lambda,$$

where the reflective grating includes a plurality of periods, d is a period of the reflective grating, $\theta_i$ is an incident angle of the light incident onto the reflective grating, $\theta_m$ is a reflective angle of the m-th order diffracted light, $\lambda$ is a wavelength of the light incident onto the reflective grating, and $|m*\lambda/d|<2$.

4. The display device according to claim 1, wherein:
the $-1^{th}$ order diffracted light is refracted at the transparent dielectric layer surface to form the outgoing light.

5. The display device according to claim 4, wherein:
the $0^{th}$ order diffracted light undergoes a total internal reflection in the transparent dielectric layer.

6. The display device according to claim 5, wherein:
the +11 order diffracted light undergoes a total internal reflection in the transparent dielectric layer.

7. The display device according to claim 1, wherein:
the $0^{th}$ order diffracted light undergoes a total internal reflection in the transparent dielectric layer.

8. The display device according to claim 1, further including:
a light source disposed in a couple-in area of the transparent dielectric layer.

9. The display device according to claim 8, wherein:
a side surface of the transparent dielectric layer is the couple-in area of the transparent dielectric layer.

10. The display device according to claim 8, wherein:
the transparent dielectric layer surface is the couple-in area of the transparent dielectric layer.

11. The display device according to claim 8, wherein:
an inclined side surface of the transparent dielectric layer is the couple-in area of the transparent dielectric layer, and
light emitted by the light source is perpendicularly incident onto the inclined side surface of the transparent dielectric layer.

12. The display device according to claim 1, wherein:
the plurality of reflective gratings are disposed on the first surface of the base layer.

13. The display device according to claim 12, further including:
a reflective layer disposed on the first surface of the base layer, wherein the reflective layer is disposed on the plurality of reflective gratings.

14. The display device according to claim 13, wherein:
the reflective layer includes a metal material.

15. The display device according to claim 1, wherein:
a reflective grating has a thickness of Ds, wherein 50 nm≤Ds≤1000 nm.

16. The display device according to claim 1, wherein:
the transparent dielectric layer has a thickness of Dt, wherein 10λ≤Dt≤5 mm, where λ is the wavelength of the light incident onto the reflective grating.

17. The display device according to claim 1, further including:
the display panel is a liquid crystal display panel.

* * * * *